United States Patent
Castor et al.

[11] 3,785,290
[45] Jan. 15, 1974

[54] BOMB FIN SHOCK ABSORBER ASSEMBLY

[75] Inventors: Gary E. Castor, China Lake, Calif.;
William J. De Gain, Warren, Mich.

[73] Assignee: The United States of America as represented by the Scetretary of the Navy, Washington, D.C.

[22] Filed: Mar. 1, 1971
(Under Rule 47)

[21] Appl. No.: 119,769

[52] U.S. Cl. .................. 102/4, 138/121, 188/1 C
[51] Int. Cl. ............................................. F42b 25/02
[58] Field of Search .............. 188/1 C; 244/138 R, 244/138 D; 102/4

[56] References Cited
UNITED STATES PATENTS

| | | |
|---|---|---|
| 3,508,633 | 4/1970 | Nishimura et al. ............... 188/1 C |
| 3,412,628 | 11/1968 | De Gain ........................... 188/1 C X |
| 3,470,761 | 10/1969 | Okahoto et al. ................. 188/1 C X |
| 2,857,510 | 10/1958 | Haggerty et al. ................. 188/1 C |
| 3,228,634 | 1/1966 | Chakoian et al. ................ 102/4 X |
| 3,461,531 | 8/1969 | De Gain ........................... 29/163.5 R |
| 3,578,777 | 5/1971 | De Gain ........................... 138/121 |

*Primary Examiner*—Samuel W. Engle
*Attorney*—R. S. Sciascia, Roy Miller and R. W. Adams

[57] ABSTRACT

A bomb fin shock absorber assembly having a bomb fin support attached to a bomb by set screws, and a bellows type shock absorber slideably mounted on said support. A collar mounted on one end of the shock absorber is coupled to the bomb fin by link members such that the shock absorber will reduce the shock caused by the opening bomb fin, by collapsing at least in part.

1 Claim, 4 Drawing Figures

3,785,290

BOMB FIN SHOCK ABSORBER ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Prior bomb fin shock absorber assemblies are of the sleeve and plunger type. The shock absorber comprises two steel tubes and a collar. The collar is attached to one end of the first tube. The other end of the first tube is inserted into an expanded end of the second tube. When a force is applied longitudinally the first tube is forced farther into the second tube, deforming the second tube, and thereby dissipating the applied force.

The assembly additionally comprises a support, attached to the bomb by a retaining ring and garter spring, upon which the shock absorber is slideably mounted.

The sleeve and plunger type shock absorber assembly is unsatisfactory for use in high speed bomb delivery systems because it permits the shock load to become excessive before dissipation is initiated, its high initial shock resistance drops off sharply, and it is difficult to mass-produce due to required tolerances and stringent material and heat-treat requirements.

SUMMARY OF THE INVENTION

The present invention is a bomb fin shock absorber assembly comprising a bellows type shock absorber in the form of a convoluted steel tube. A frist group of convolutions are reinforced by ribs extending longitudinally of said tube. A second group of convolutions are weakened by shaving their ridges. A collar similar to that of the prior assembly, but modified for the prescribed application, is mounted on one end of the shock absorber. The support, upon which the shock absorber is slideably mounted, is modified by substituting set screws for the retaining ring and garter spring of the prior assembly.

The present invention has the advantage over the prior device of early engagement with low initial and gradually increasing resistance, increased maximum release airspeed, reduced dispersion, improved reliability, simpler production, and reduced cost.

DESCRIPTION OF THE PREFERRED EMBODIMENT

Figure 1A:
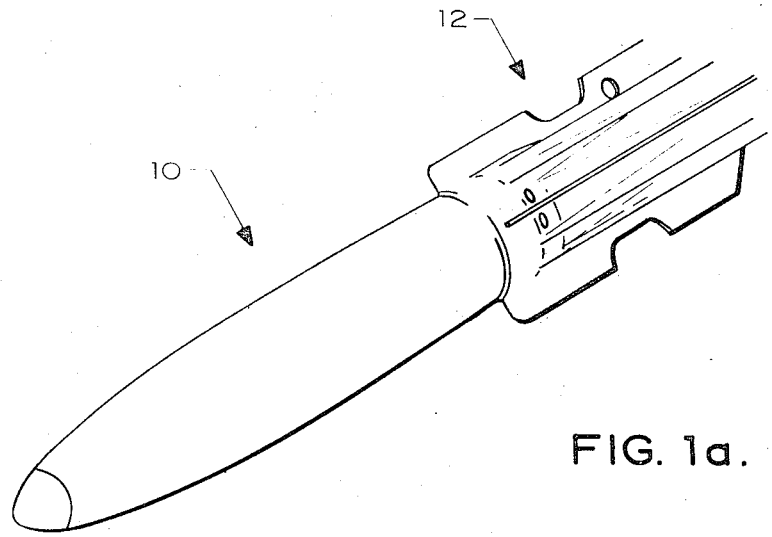
FIG. 1a is a perspective view of a bomb and bomb fin assembly, including the present invention, before fin opening.
Figure 1B:
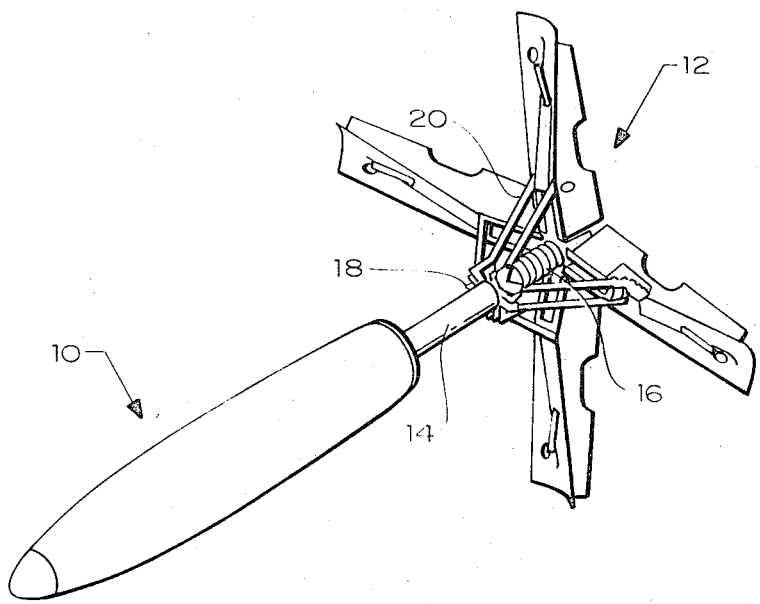
FIG. 1b is a perspective view of a bomb and bomb fin assembly, including the present invention, after fin opening.

Bomb 10 and bomb fin assembly 12 are shown in FIG. 1. FIG. 1a shows the bomb 10 and bomb fin assembly 12 immediately before fin opening is initiated. FIG. 1b shows the bomb fin assembly 12 fully opened, exposing support 14, crushed shock absorber 16, collar 18, and link members 20.

Figure 2:
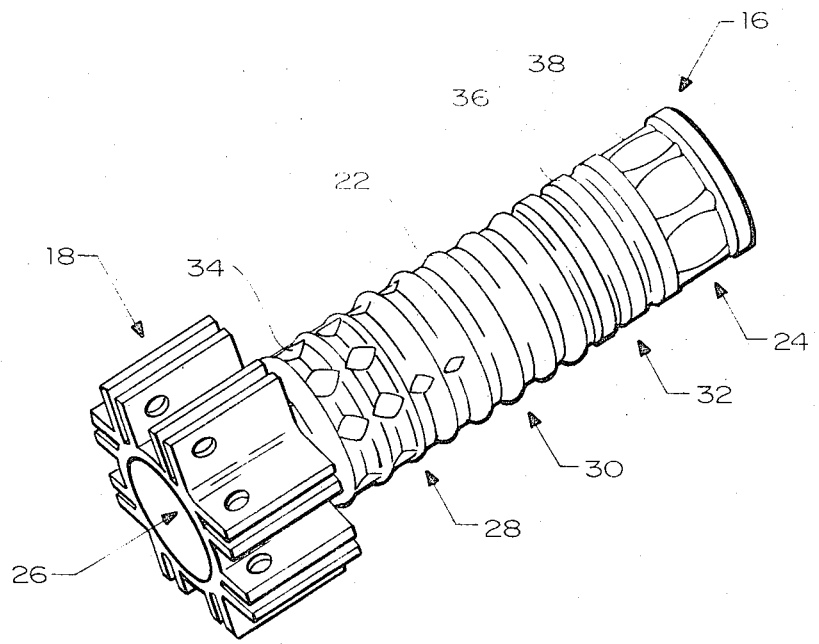
FIG. 2 is a perspective view of the shock absorber and collar of the present invention.

Shock absorber 16 and collar 18 are shown in FIG. 2. Shock absorber 16 is a steel tube having a midsection 22 consisting of convolutions, and substantially cylindrical end sections 24 and 26 wherein end section 24 includes reinforcing ribs 38 for support. End section 24 is substantially cylindrical to provide clearance in the closed fin configuration for the blades of assembly 12; and end section 26 is substantially cylindrical for attachment to collar 18.

The midsection 22 is composed of subsections 28, 30, and 32. Subsection 28 has a plurality of convolutions with reinforcing ribs 34 disposed between the ridges of adjacent convolutions for support. The number of ribs 34 between adjacent ridges is directly related to the force necessary to collapse the convolution. Therefore, the degree of support desired determines the number of ribs chosen to be disposed between adjacent ridges.

Subsection 30 consists of unmodified convolutions. The wall thickness of midsection 22 remains unchanged except where shaved. That is, the wall thickness of subsections 28 and 30 through ridge, valley, and rib from convolution to convolution is a constant.

Subsection 32 includes a plurality of convolutions having shaved ridges 36. The wall thickness at ridges 36 is thereby reduced, providing convolutions that will collapse under light, or initial, load conditions.

As an example, shock absorber 16 can be made from steel having an AISI number 1008, and shaped by a hydraulic forming process. Collar 18 can be made from aluminum 6061T6.

Figure 3:
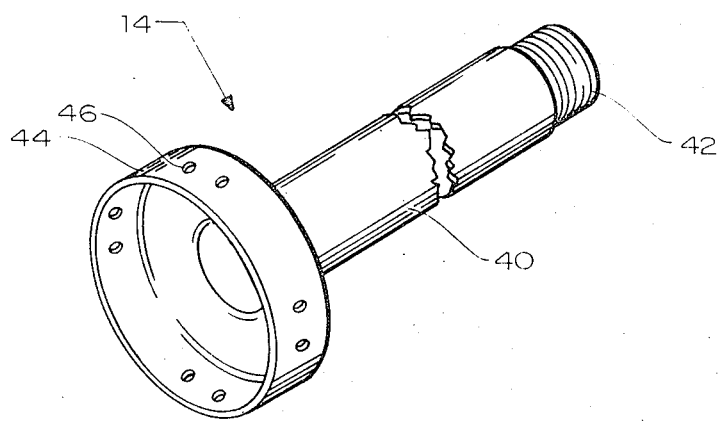
FIG. 3 is a perspective view of a support used with the present invention.

Support 14 is shown in FIG. 3. Support 14 has a cylindrical member 40 upon which shock absorber 16 and collar 18 are slideably mounted, a threaded end 42 to which the fin assembly is fixedly mounted, and an enlarged end 44 designed to be mounted on the tail of bomb 10 by set screws 46. When assembled in operative form, cylindrical member 40, shock absorber 16 and collar 18 are coaxial.

The operation of the present invention is as follows: When the bomb 10 is released, the opening of the blades of bomb assembly 12 is initiated. The blades are thereafter forced by air pressure toward their full open configuration. The force applied to the blades is transmitted to collar 18 via link members 20. The force applied to collar 18 is absorbed by shock absorber 16, which is fixedly attached to collar 18, such as by a rolling process. The convolutions of subsection 32, which have weakened ridges 36 due to a shaving process, collapse under the initial light load of the fin 12 opening process. As the applied load increases, subsections 30 and 28 collapse in turn, dissipating the energy of the increasing load. When the blades of fin assembly 12 have been completely extended to fully open configuration, all of the convolutions of shock absorber 16 will have collapsed, resulting in a substantially shortened tubular structure (FIG. 1).

The shock caused by the opening bomb fin assembly 12, which causes considerable damage to the assembly of prior devices, is efficiently dissipated by the present invention. Additionally, the bomb release airspeed can be increased without reduction of reliability, thereby improving the pilot and aircraft safety factor.

What is claimed is:

1. A shock absorber for dissipating the force applied to a device attached to the absorber by collapsing in a predetermined manner, and, thereby, reducing the destructive effect of the force on the device, consisting of:
   a tubular member having a solid wall with interior and exterior surfaces and first, second and third convoluted sections and first and second substantially cylindrical end sections wherein each said convoluted section has a plurality of solid circumferential roots and ridges longitudinally alternating in the wall of said tubular member;
   a plurality of supporting ribs in each said root of said first convoluted section sonsisting of circumferentially spaced protuberances in the wall of each said root joining adjacent ridges to provide increased longitudinal collapse resistance to said member at said first convoluted section;
   modified ridges in said second convoluted section consisting of a circumferentially uniform, flattened exterior planar surface at each ridge parallel to the longitudinal axis of said member, and a circumferentially uniform, reduced wall thickness in said member at each said flattened surface to provide a reduced longitudinal collapse resistance to said member at said second convoluted section;
   wherein said third convoluted section is unmodified, and is between and connects said first convoluted section to said second convoluted section, and said first end section is adjacent said second convoluted section and said second end section is adjacent said first convoluted section; and
   wherein the member's interior surface at said second convoluted section is identical to the interior surface at said third convoluted section;
   a circumferentially uniform annular protuberance in the wall of said member at the end of said first end section that is opposite the end adjacent said second convoluted section;
   circumferentially spaced protuberances in the wall at said first end section between and connecting said annular protuberance to said second convoluted section of a longitudinal length greater than the longitudinal length of the protuberances of said first convoluted section; and
   a collar attached to said member at said second end section having a plurality of circumferentially spaced flanges extending longitudinally of, and outward from, said second end section for mounting said device;
   such that predetermined and different amounts of force are required to collapse, and are dissipated by collapsing, said first, second and third sections, and when said force is applied said second section collapses first, said third section second, and said first section last, until the force is absorbed.

* * * * *